United States Patent [19]
Hartig

[11] 3,921,610
[45] Nov. 25, 1975

[54] METHOD AND SYSTEM FOR PRODUCING A SIGNAL DETERMINING THE VALUE AND PHASE POSITION OF THE CLOSING ANGLE OF AN INTERNAL COMBUSTION ENGINE

[76] Inventor: Gunter Hartig, Hansastrasse 29, Karlsruhe 21, Germany, D-7500

[22] Filed: Mar. 25, 1974

[21] Appl. No.: 454,736

[30] Foreign Application Priority Data
July 23, 1973 Switzerland........................ 10739/73

[52] U.S. Cl. .......................... 123/117 R; 123/148 E
[51] Int. Cl.² ............................................ F02P 1/00
[58] Field of Search ...................... 123/117 R, 148 E

[56] References Cited
UNITED STATES PATENTS

| | | | |
|---|---|---|---|
| 3,454,871 | 7/1969 | Nolting............................. | 123/117 R |
| 3,592,178 | 7/1971 | Schiff................................ | 123/117 R |
| 3,738,339 | 6/1973 | Huntzinger et al. ............. | 123/117 R |
| 3,749,073 | 7/1973 | Asplund........................... | 123/117 R |
| 3,752,139 | 8/1973 | Asplund........................... | 123/148 E |
| 3,757,755 | 9/1973 | Carner............................. | 123/117 R |

Primary Examiner—Charles J. Myhre
Assistant Examiner—Joseph Cangelosi
Attorney, Agent, or Firm—Toren, McGeady and Stanger

[57] ABSTRACT

An ignition system for an internal combustion engine, having as its object to close the ignition coil circuit each time a spark is required, for a constant time $t'$ just sufficient to saturate the core of the induction coil, the time being independent of engine speed. The system operates on digital pulses, trains of which are produced by toothed wheels on the engine shaft. The system uses two counter-comparator assemblies per spark channel (per cylinder). Each receives a reference corresponding to the time between engine top dead centre and an arbitrary advance point $\psi 0$ representing an angle $\psi$ of rotation. The first counter comparator counts pulses equal to an advance angle $\alpha$ (time $t$) plus an angle $\phi$ equal to the said time $t'$ which is a multiple of $t$. This number representing an angle $\delta$ is subtracted from pulses representing the angle $\psi$, and after the remainder has been counted from the point $\psi 0$, the coil circuit is closed. The second counter-comparator counts pulses equal to angle $\psi - \alpha$, thereupon opening the coil circuit and producing the spark. Multicylinder engine circuits using the same principle may be provided, with suitable phase angles between the sparks.

39 Claims, 15 Drawing Figures

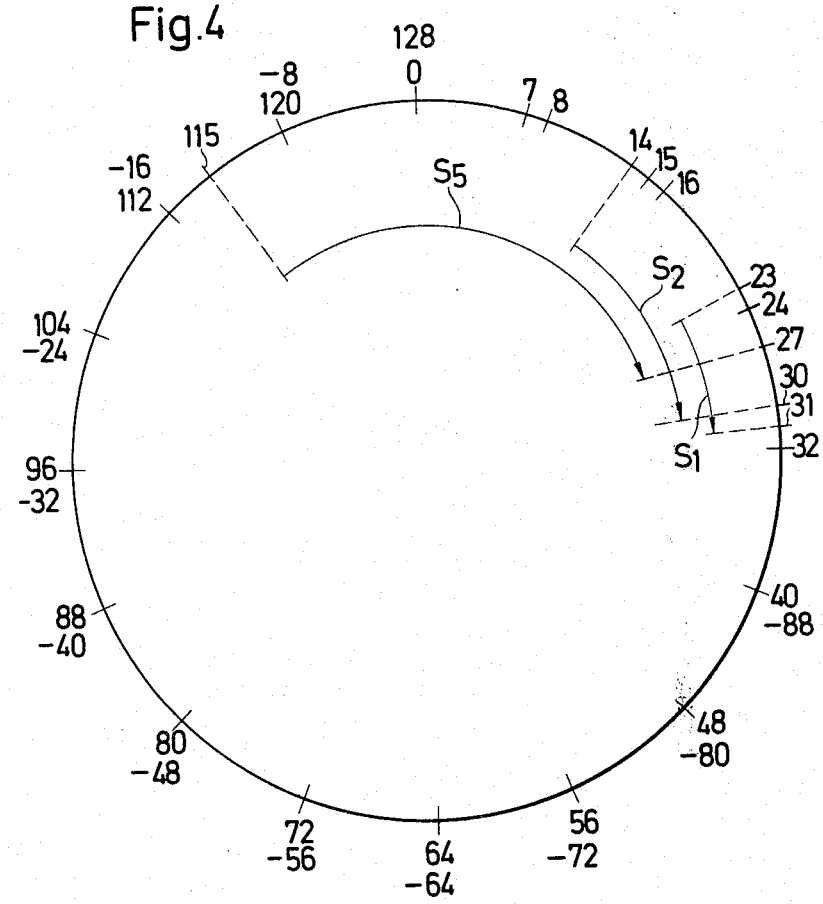

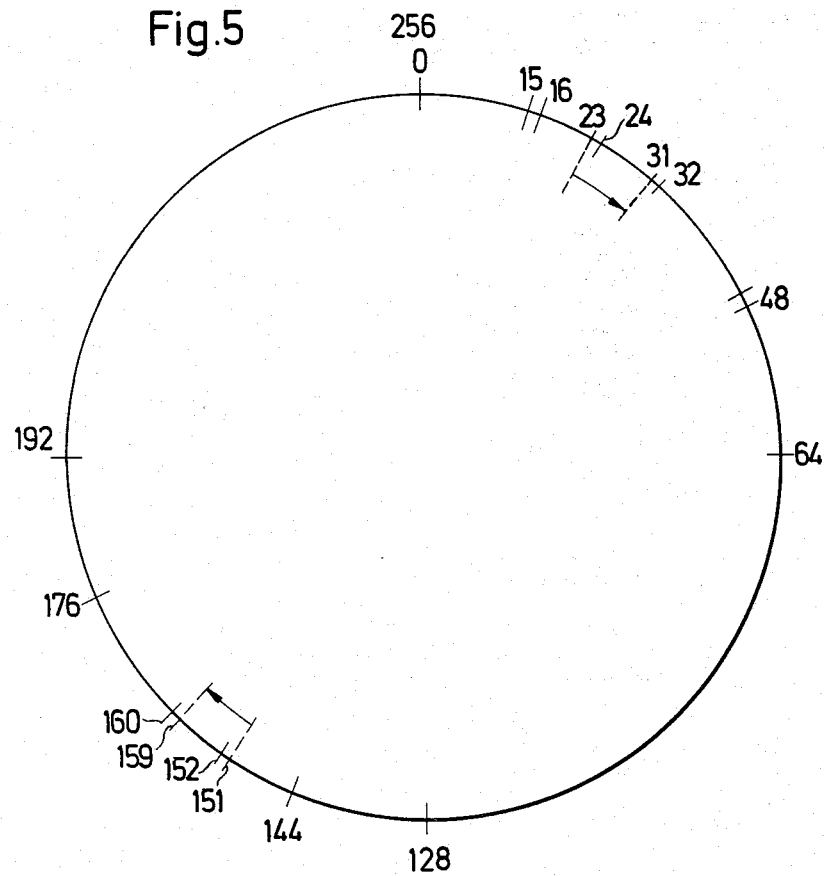

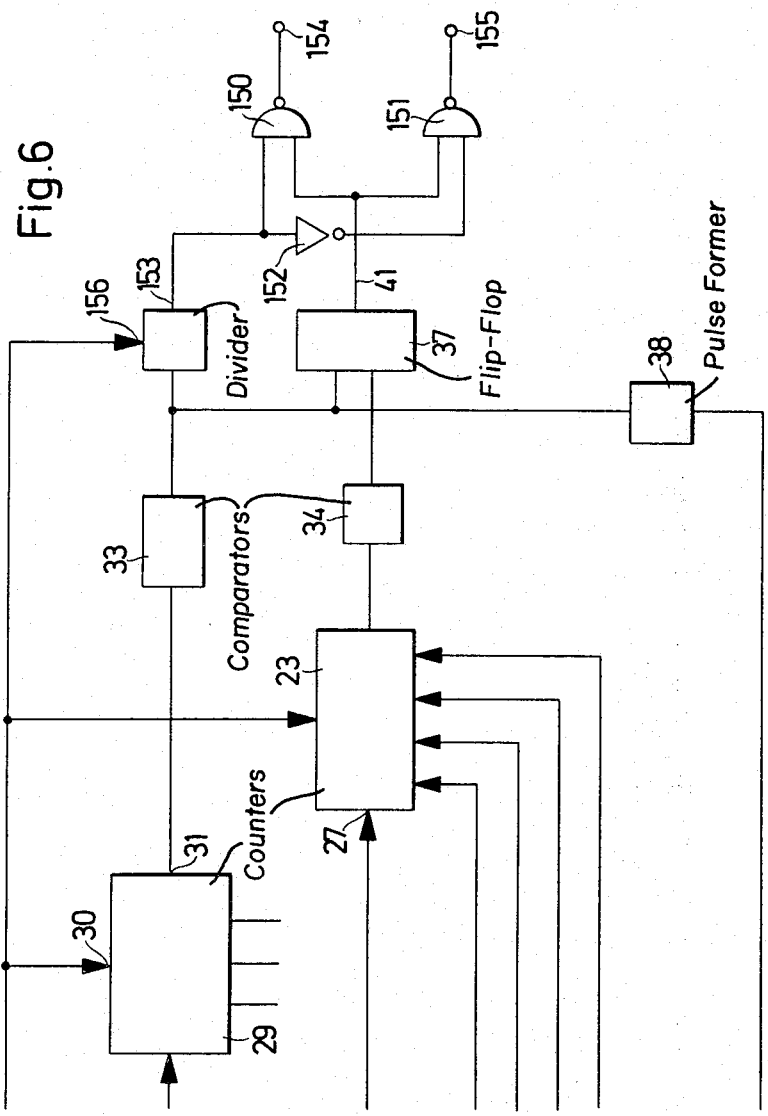

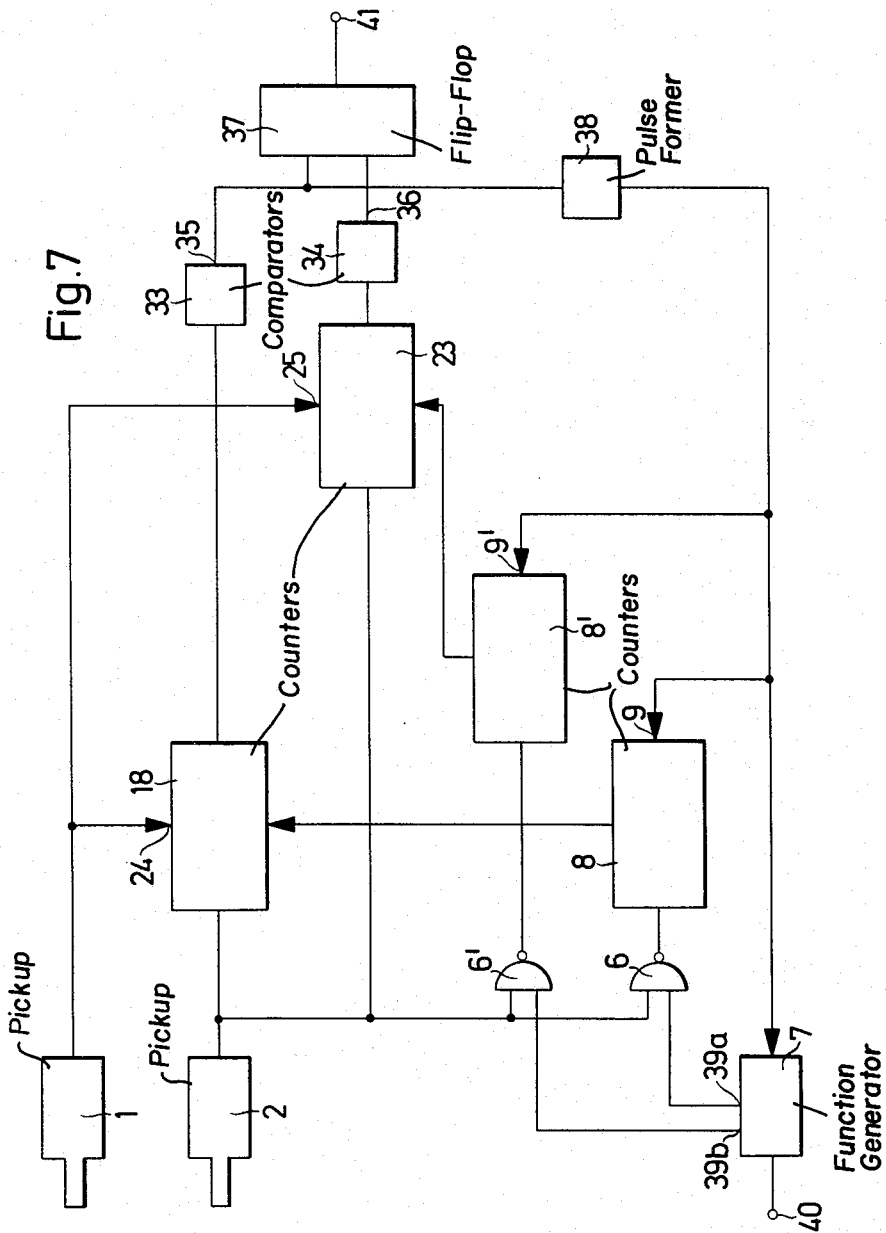

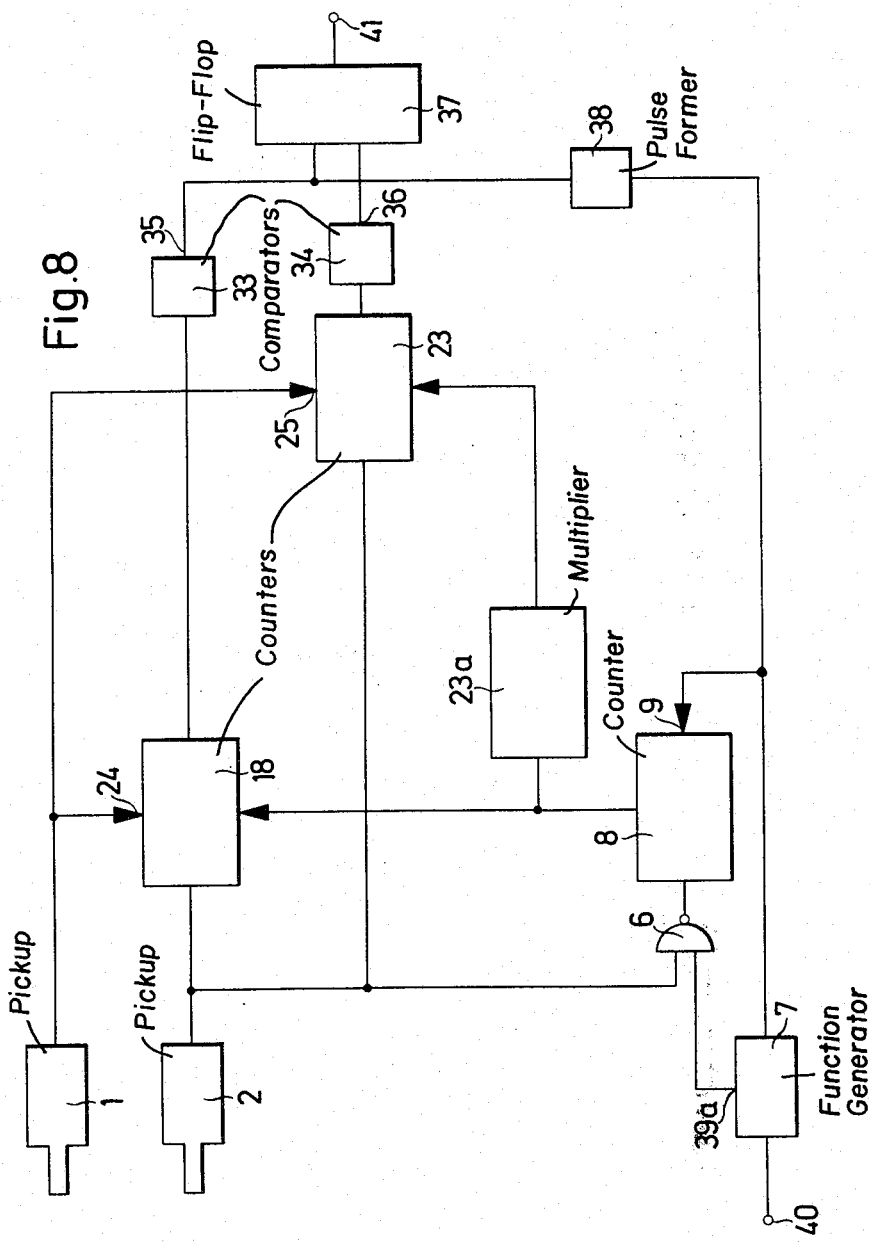

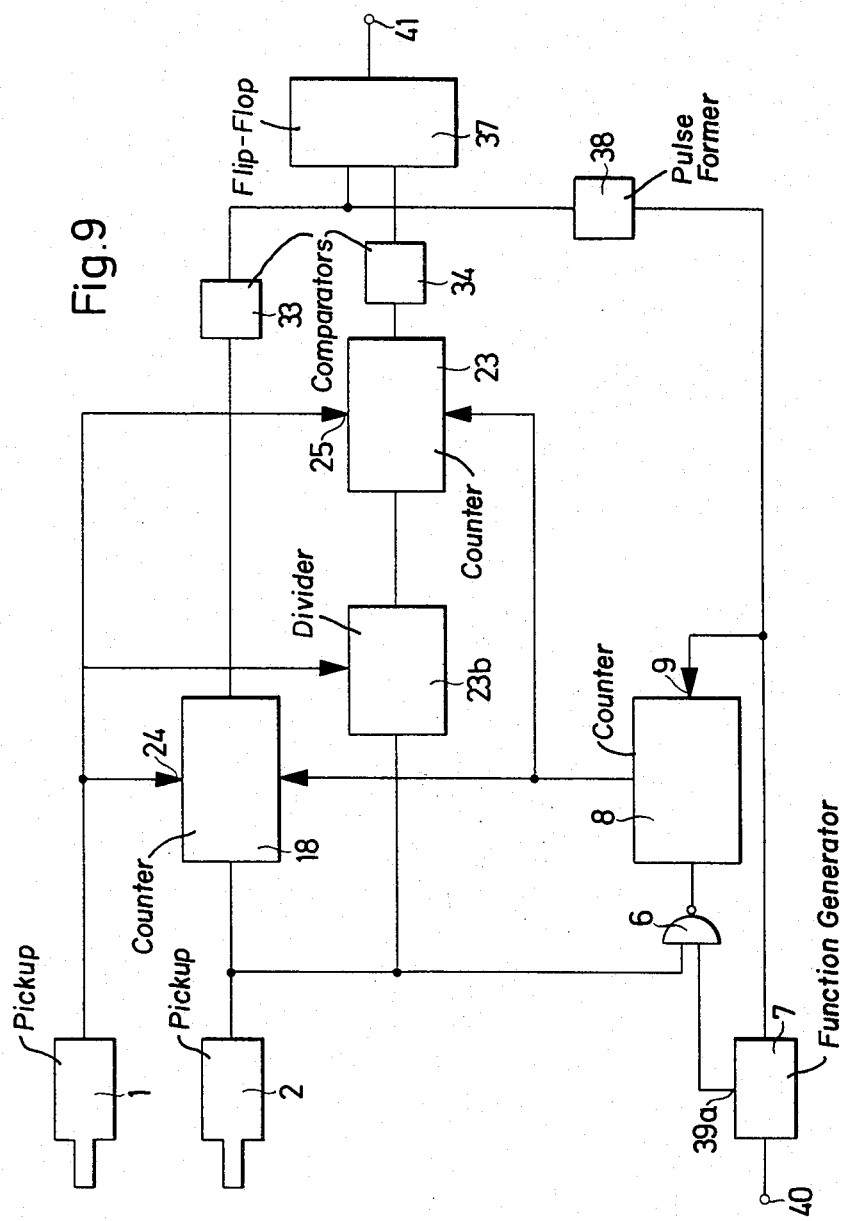

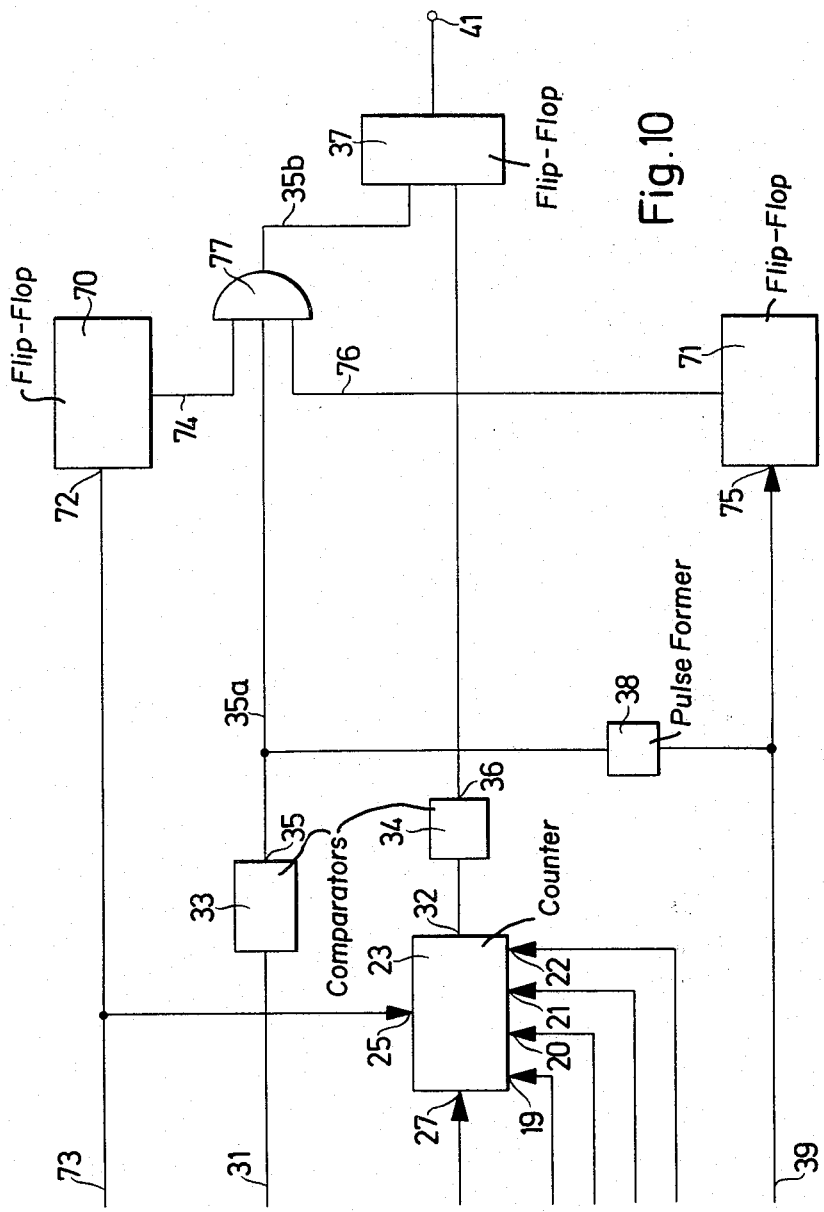

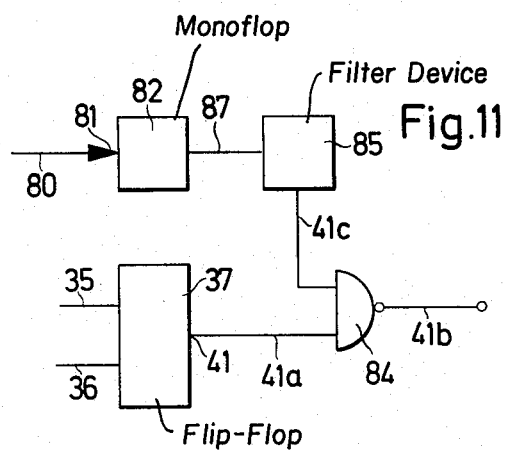
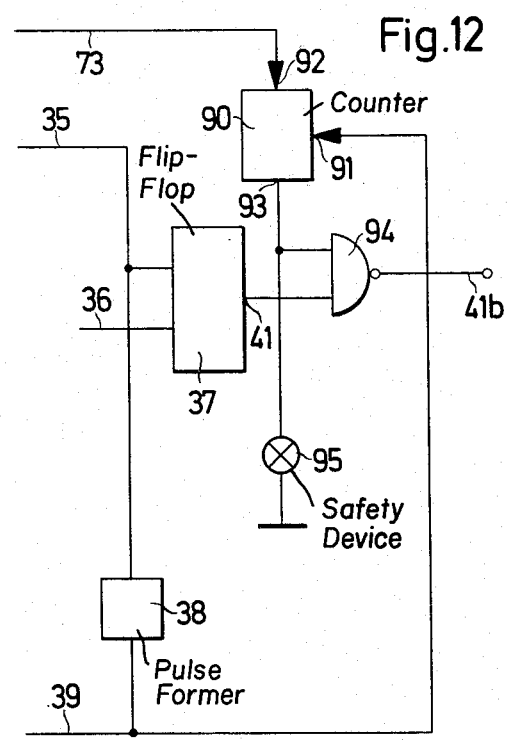

METHOD AND SYSTEM FOR PRODUCING A SIGNAL DETERMINING THE VALUE AND PHASE POSITION OF THE CLOSING ANGLE OF AN INTERNAL COMBUSTION ENGINE

The present invention concerns a method and apparatus for producing a signal determining the value and phase advance of the ignition of an internal combustion engine wherein pulse sequences are produced, the main pulses of which are synchronously produced with the rotation of the internal combustion engine, and in which the advance angle $\alpha$ corresponding to a predetermined time $t$, by which the ignition of the internal combustion engine should be advanced relatively to the top dead centre OT, is determined during a particular number of rotations U of the internal combustion engine by counting the pulses emitted during the time $t$ and deducting them from a larger angle $\psi$ which extends between the top dead centre and an arbitrary phase position $\psi$ O displaced forwardly relatively thereto and determined by a predetermined number of pulses, before the counting of the predetermined pulses begins during the arbitrary phase position $\psi$ O; and that an ignition pulse is produced during this counting when the differential angle $\psi - \alpha$ is tranversed, so that the ignition pulse is advanced by the angle $\alpha$ relatively to the top dead centre. In addition, the present invention concerns apparatus for carrying out this method.

In the case of conventional internal combustion engines having separate ignition, where an ignition coil is used, the angle of rotation traversed by the internal combustion engine between the switching on and off of the ignition coil is constant. It must therefore be selected so that, even with the fastest speeds of rotation, the magnetic field in the ignition coil is fully built up before a spark is to be produced. This means, however, that an unnecessarily large contact closing time is obtained at low speeds of rotation, so that the current in the primary of the ignition coil flows longer than is required for building up the magnetic field, a feature which involves an unnecessary waste of energy and produces a high temperature in the ignition coil.

The object of the present invention is to provide a method and apparatus by which it is possible to prevent this unnecessary comsumption of energy.

According to the present invention there is therefore provided a method of producing a signal (operating pulse) determining the value and phase position of a closing angle of the ignition system of an internal combustion engine, wherein pulse sequences are synchronously produced by the rotary movement of the internal combustion engine, and in which an advance angle $\alpha$ and a predetermined time $t$ by which the closure of the coil circuit is to be advanced relatively to its top dead centre OT, is determined by counting the pulses appearing during the time $t$ at a particular speed of rotation U of the internal combustion engine, adding the pulses to the number of pulses representing the angle $\alpha$, and subtracting the sum from the pulses representing a larger angle $\psi$ which extends in advance of the top dead centre to an arbitrary phase position $\psi$ O, an ignition pulse being produced when the difference angle $\psi - \alpha$ has been traversed so that the ignition pulse is advanced by the angle $\alpha$ relatively to the top dead centre, wherein an angle $\delta$ (trigger angle) which changes in the same phase as the advance angle $\alpha$ in dependence on the speed of engine rotation U and is equal to the sum of the angle $\alpha$ and the closing angle $\phi$, is represented by a number of pulses dependent on the speed of rotation U, this number of pulses being subtracted from the number of pulses representing the angle $\psi$ before the counting of the $\psi$ angle pulses begins from the arbitrary phase position $\psi$ O to produce a pulse (operation pulse) during this counting when the differential angle $\psi - \phi$ is traversed, so that the operation pulse is advanced by the closing angle $\phi$ relative to the advance angle $\alpha$.

According to an aspect of the present invention a system for carrying out a method includes at least one measuring device for obtaining the number of pulses (main pulses) corresponding to the advance angle $\alpha$ and/or the trigger angle $\delta$, synchronously with the rotation of the internal combustion engine the pulses being distributed equidistantly in time, and an initial counting and comparing device which receives the value corresponding to the advance angle $\alpha$ or the trigger angle $\delta$ or a derivative thereof from the measuring device in a predetermined phase of the movement period of the internal combustion engine and, starting from the arbitrary point phase $\psi$ O counts the main pulses directly or through a divider and, in a predetermined counting condition corresponding to the traversing of the differential angle from $\psi - \delta$ from the position O, delivers an operating pulse and a second counting and comparing device which receives the numeral value corresponding to the advance angle $\alpha$ from the measuring device in the take-over phase, and starting from the point $\psi$ O counts the main pulses, and in a predetermined counting condition corresponding to the traverse of the angle $\psi - \alpha$ from the position $\psi$ O, delivers an ignition pulse.

The invention will now be described with reference to the accompanying drawings, in which:

FIGS. 4 and 5 show schematics illustrative of the mode of operation of the invention;

FIG. 6 is a modified embodiment of the invention;

FIGS. 7 to 9 show second, third and fourth embodiments of the invention;

FIGS. 10 to 13 show modifications of embodiments of the invention; and

Figure 1:
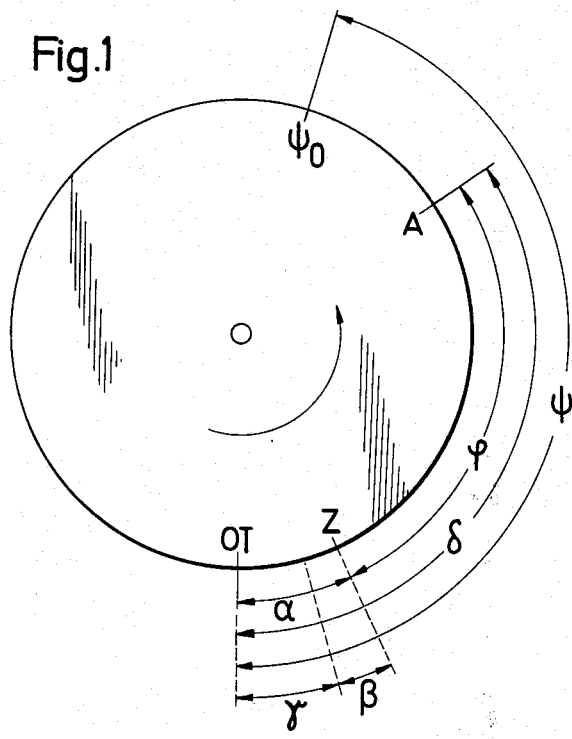
FIG. 1 shows the various angles used in describing the invention.

FIG. 1 shows the upper dead centre position OT on a disc coupled to the crank shaft, a point Z where the mixture is ignited by a spark in the cylinder chamber of an engine, and a point A where the current for building up the magnetic field in the ignition coil is switched on. The disc turns in the direction indicated by the arrow. The ignition coil comprises a primary coil and a secondary coil, the current being switched on at the point A (FIG. 1) to the primary coil and interrupted at the point Z so that, whereupon a high voltage is produced in the secondary coil, which produces a spark at the spark gap of a spark plug. The angle between A and Z is termed the "closing angle" $\phi$.

FIG. 1 also shows a arbitrary phase angle $\psi$ O which is well ahead of the top dead centre OT and from which the actual counting operation proceed, leading to the triggering of an operation pulse A representing the beginning of the closing angle, and finally an ignition pulse at the end of the closing angle at Z. The angle $\psi$ extending from $\psi$ O to OT is here termed a "reference angle" and the angle $\delta$ between A and OT is a "trigger angle."

The method of the present invention is described in greater detail hereinafter initially in connection with embodiments shown in FIGS. 3 and 6 to 9 with reference to the schematics in FIGS. 4 and 5.

Figure 2:
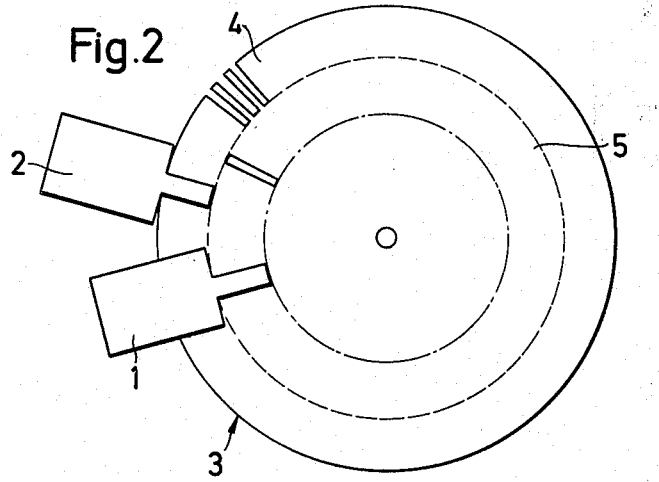
FIG. 2 shows a pulse generating device used in the invention.

The system, the arrangement of which is illustrated in FIG. 2, for producing main and auxiliary pulses (the counting operations and the synchronising of the device of the present invention are controlled by the latter), comprises an initial transmitter or pickup 1 and a second transmitter or pickup 2 which produce pulses by the passage of a disc 3 which has teeth and gaps and is rotated by the movement of the internal combustion engine, by being keyed on the crank shaft. This disc has two rows of teeth and gaps, an outer row 4 and an inner row 5, the teeth which may be 128 in number, of which only some are shown in FIG. 2, are uniformly distributed over the circumference in the row 4 with which the transmitter 2 co-operates. A much smaller number of teeth and gaps is provided in the row 5 with which the transmitter 1 co-operates; of these a gap is shown in FIG. 2, the teeth and gaps in row 5 serving to produce auxiliary pulses which more particularly control the calculating process (i.e., the work of the counters coupled to the transmitters and thus define the phase positions of the pulses (main pulses) produced by the teeth and gaps of the row 4. In the simplest case the inner row 5 has only one tooth or one gap.

The pulses from the transmitter 2 are fed by way of a gate 6 (FIG. 3) kept open by a function generator 7 for a predetermined time $t$, to a counter 8. This counter comprises four binary stages, for example flip-flop stages, connected in series; it therefore has a maximum counting range of $2^4 = 16$ units. This means that the counter 8 can count 0 – 15. This counter is designed so that, after reaching the counting condition "15," it remains in this condition, even if other input pulses enter the input through the gate 6; the counter 8 then remains in condition "15" until reset by a pulse at the input 9.

From its binary stages, the counter 8 has four outputs 10 – 13, each of which forms an input of a binary stage. The outputs of these binary stages are connected to the set inputs 14 – 17 and 19 – 22 of the counters 18 and 23. Counting takes place in the two counters 18 and 23, each of which consists of four binary stages, only if an auxiliary pulse occurs from the transmitter 1 and is fed to the start input 24 of the counter 18 or the start input 25 of the counter 23.

The counter 18 receives pulses continuously from the transmitter 2. The output 26 of the third binary stage of the counter 18 is connected to the counting input 27 of the counter 23, whilst the output 28 of the fourth binary stage of the counter 18 is connected to the counting input of another counter 29. This counter has a start input 30, similarly receiving auxiliary pulses from the transmitter 1. Since, however, the set inputs of the counter 29 are not operated, this start input means the take-over of a binary "000," because this counter has only three binary stages, though it would also be possible to set the counter 29 to another pre-determined binary numerical value if required.

The outputs of the individual binary stages of the counters 18 and 29 are shown as combined at 31, where the reference numeral 31 also comprises the output 26 of the third binary stage of the counter 18 and the output 28 of the fourth binary stage of the counter 18; thus the output 31 includes a total of seven binary stages and represents the numerical value of the counters 18 and 29, which may have 128 counting conditions. In like manner, the outputs of the first three binary stages of the counter 18 and the four binary stages of the counter 23 combined are indicated by 32.

The outputs 31 and 32 each lead to a comparator 33, 34 respectively, each of which can be programmed to respond to any desired binary value so that they emit a signal or pulse only at their outputs 35, 36 when the precise binary value appears at the outputs 31, 32 for which value the particular comparator is programed. The output 36 is connected to the set input of the RS flip-flop 37, whilst the output 35 is connected to the reset input thereof and is simultaneously applied through a pulse former 38 to the reset input 9 of the counter 8 and the trigger input 39 of the function generator 7. The counter 8 is reset to the binary value "0000" through the reset input 9.

The function generator 7 produces an output signal lasting for a time $t$ which begins whenever a pulse appears on the trigger input 39. The time $t$ can be changed from the input 40 in dependence on typical motor parameters such for example as engine temperature manifold vacuum, temperature of an afterburner and so on. A pulse, the length of which is equal to the length of the closing angle $\phi$ and at the beginning of which the primary circuit of the ignition coil is closed, appears at the output 41 of the RS flip-flop 37, and thus the build-up of the magnetic field in the ignition coil is started, whilst the circuit is opened at the end of the pulse appearing at the output 41, causing a spark across the gap of a plug.

The system shown in FIG. 3, operates as follows:

It is assumed that a pulse has appeared at the output of the comparator 33 and has reset the RS flip-flop 37 corresponding to the end of the closing angle pulse, i.e., the point Z in FIG. 1. This pulse on the output 35, passing through a pulse former stage 38 and then appearing on the set input 9 of the counter 8, also resets the counter 8 to the binary value "0000" and triggers the function generator. It is also possible to set another binary value in the counter through setting inputs (not shown), when the pulse appears at the output 9. However, it is necessary for the counter 8 to be reset somewhat earlier than when the function generator 7 is triggered. For this purpose the pulse former 38 is provided. It produces a short rectangular pulse from the pulse appearing at the output 35. The counter 8 is reset by arrival of this short rectangular pulse, whereas the triggering of the function generator 7 is effected only by the end of this pulse. During the predetermined time $t$ as determined by the function generator 7, the gate 6 is opened so that the pulses counted in the counter 8 are those derived from transmitter 2 during the time $t$. Hence, the greater the speed of rotation of the disc 3, the more pulses are counter in the counter 8.

Therefore, as soon as a pulse appears from the transmitter 1, the counters 18 and 23 receive set pulses at their inputs 24 and 25 respectively enabling them to take over the pulses stored in the counter 8, which correspond to the number of pulses stored by it in the time $t$. Reset of the counter 29 to the condition "000" is simultaneously effected through the set input 30.

At the end of the auxiliary pulse, the counter 18 starts counting the pulses appearing from the transmitter 2. At each change of the condition "111X" (i.e., "1110" or "1111") of the counter 18 to the condition "000X" (i.e., "0001" or "0000") the counter 23 receives a counting pulse at its input 27, so that the counter 18 acts as an 8-divider for the counter 23. With each change of the counter 18 from the condition "1111" to "0000," the counter 29 receives a counting pulse. The counters 29 and 23 add up these above-mentioned counting or main pulses.

In the case of a total condition "0000010" of the counters 18 and 29, this condition corresponding to receiving 32 pulses in the counter 18 which are taken over either by the set inputs 14–17 and/or by the pulse transmitter 2 through the counting input, for which the comparator 33 is programmed in the present case, a pulse is delivered to the output 35 of this comparator.

Due to the connection of the counter 23 to the counter 18, described above, it is possible for the counter 23 to count only each eighth pulse appearing from the transmitter 2. At The output 32 of the counter 23 a condition occurs which corresponds to the sum of the pulses on the set inputs 19 to 22 from the counter 8 and the pulses fed by the counter 18 to the input 27. The comparator 34 is programed so that is delivers an output signal at the ouutput 36 when the output 32 of the counter 23 has the condition "0010," corresponding to counting four pulses by the counter 23. The output signal of this comparator sets the flip-flop 37 so that the rise of a closing angle pulse $\phi$ appears at the output 41.

Referring to FIG. 4, since the emitters 1 and 2 are arranged so that even at a very low speed of rotation, at least one pulse is counter in the counter 8, the following process takes place for the lowest speeds of rotation:

The counter 8 emits a binary signal "1000" from its outputs. This signal is taken over by the counters 18 and 23 when the auxiliary pulse appears from the transmsiter 1. In FIG. 4 this auxiliary pulse appears at the position "0." Since the counting of the pulses appearing in the emitter 2 begins by the counter 18 simultaneously with the end of the auxiliary pulse, a pulse appears coinciding with the 31st tooth, i.e., at the place "31" in FIG. 4, (since each of the Arabic numerals in FIG. 4 indicates the number of the tooth, calculated from the place "0"). The comparator is, as stated above, programed so that it emits a pulse when there appears at the output 31 a condition corresponding to the fact that the counter 8 has counted 32 pulses to the counter 18 (both signals occurring at the set inputs and the counting inputs simultaneously).

The counter 18 has assumed, upon the appearance of the auxiliary pulse, a condition corresponding to the counting of a pulse, and a counting pulse has appeared at the input 27 of counter 23 at each eighth pulse entering the counter 18. The counter 23 has been brought to the counting condition upon the appearance of the auxiliary pulse, which condition corresponds to the counting of a pulse, and then to the condition "0100," corresonding to the counting of two pulses when the counter 18 has received seven pulses from the transmitter 2. Since, during further counting, the condition of the counter 23 is always increased by a counting pulse if in turn eight teeth have been passed by the transmitter 2, the counter 23 reaches the condition "0010" at the twenty-third tooth, for which the comparator 34 is programmed, so that a pulse is given by it to the set input of the flip-flop 37 starting the closing angle pulse, this time corresponding to the rising flank of the closing angle pulse (position A in FIG. 1). In this case the closing angle pulse $S_1$ comprises a range of eight teeth (tooth 23–31 in FIG. 4) corresponding to the comparatively slow speed of rotation.

If, with a somewhat greater speed of rotation, the time $t$ is that in which two teeth pass the transmitter 2, then the counters 18 and 23 assume a binary value corresponding to the condition "2" of the counter ("0100"). The counter 23 receives an initial pulse through 26, 27 when the sixth pulse has appeared in the emitter 2 so that it merges into the condition "1100" of the counter; another eight pulses of the emitter 2 must then follow until the counter 23 has reached the counting condition in which the comparator 34 gives a pulse, which is the case after a total of 6 + 1 × 8 pulses from transmitter 2, i.e., at position 14 in FIG. 4. The counters 18 and 29, however, after taking over the count of the counter 8, must receive a further 32 − 2 = 30 pulses from the transmitter 2 before the comparator 23 emits a pulse at the outlet 35. Therefore the pulse corresponding to the beginning of the closing angle pulse $S_2$ appears at 14 in FIG. 4, whilst a pulse corresponding to the end of the closing angle and to the moment of ignition, appears at 30. The conditions are reproduced in greater detail in Table 1, to which reference is made together with the explanation of the individual columns I–V given in connection therewith.

In the following Tables 1 and 2, the columns represent the following, being based on a number of 128 teeth.

I = number of pulses and teeth corresponding to the time $t$ (i.e., condition of the counter 8 at transfer to the counters 18 and 23);

II = number of pulses which still have to be counted from the transfer by the counter 18 until the comparator 33 delivers a pulse (the position in FIG. 4, in which the pulse appears at the output 35);

III = number of pulses which must still appear from the transmitters 2 from the transfer moment until the comparator 34 delivers a pulse (the position in FIG. 4 at which the pulse appears at the output (36);

IV = difference between values of columns II and III, i.e., the number of pulses of the transmitter 2, at which the pulse appears at the output 36 before the pulse at the output 35 (it should be noted that teeth 1 – 4 corresponds to four teeth before 0);

V = quotient of IV and I, i.e., the length of the closing angle $\phi$ relatively to the length of the ignition angle $\alpha$.

TABLE 1

| I | II | III | IV | V |
|---|----|-----|-----|----|
| 1 | 31 | 7 + 2 × 8 = 23 | 8 | 8 |
| 2 | 30 | 6 + 1 × 8 = 14 | 16 | 8 |
| 3 | 29 | 5 + 0 × 8 = 5 | 24 | 8 |
| 4 | 28 | 0 − 4 + 5 × 8 = 124 | 28–32 | 7–8 |
| 5 | 27 | 3 + 14 × 8 = 115 | 40 | 8 |
| 6 | 26 | 2 + 13 × 8 = 106 | 48 | 8 |
| 7 | 25 | 1 + 12 × 8 = 97 | 56 | 8 |
| 8 | 24 | 0 + 12 × 8 = 96 | 56 | 7 |
| 9 | 23 | 7 + 10 × 8 = 87 | 64 | ca.7.1 |
| 10 | 22 | 6 + 9 × 8 = 78 | 72 | 7.2 |
| 11 | 21 | 5 + 8 × 8 = 69 | 80 | ca.7.3 |
| 12 | 20 | 4 + 7 × 8 = 60 | 88 | ca.7.3 |
| 13 | 19 | 3 + 6 × 8 = 51 | 96 | ca.7.4 |
| 14 | 18 | 2 + 5 × 8 = 42 | 104 | ca.7.4 |

TABLE 1-continued

| I | II | III | IV | V |
|---|----|-----|-----|------|
| 15 | 17 | 1 + 4 × 8 = 33 | 112 | ca.7.5 |

TABLE 2

| I | II | III | IV | V |
|---|----|-----|-----|---|
| 1 | 31 | 3 × 8 = 24 | 7 | 7 |
| 2 | 30 | 2 × 8 = 16 | 14 | 7 |
| 3 | 29 | 1 × 8 = 8 | 21 | 7 |
| 4 | 28 | 0 × 8 = 0 | 28 | 7 |
| 5 | 27 | 15 × 8 = 120 | 35 | 7 |
| 6 | 26 | 14 × 8 = 112 | 42 | 7 |
| 7 | 25 | 13 × 8 = 104 | 49 | 7 |
| 8 | 24 | 12 × 8 = 96 | 56 | 7 |
| 9 | 23 | 11 × 8 = 88 | 63 | 7 |
| 10 | 22 | 10 × 8 = 80 | 70 | 7 |
| 11 | 21 | 9 × 8 = 72 | 77 | 7 |
| 12 | 20 | 8 × 8 = 64 | 84 | 7 |
| 13 | 19 | 7 × 8 = 56 | 91 | 7 |
| 14 | 18 | 6 × 8 = 48 | 98 | 7 |
| 15 | 17 | 5 × 8 = 40 | 105 | 7 |

At higher speeds of rotation at which the transfer value amounts to 5 or more, i.e., higher than the triggering value of the comparator 34, the counter 23 must receive enough pulses that in the following counting cycle of this counter, the triggering value "0010" of the comparator 34 is reached. If, for example, the value 5 is accepted by the counter 23 at "0," this counter must continue to count to the tooth 115 (see fifth horizontal column of Table 1), at which the triggering value of the comparator 34 is reached and an operating pulse is consequently produced thereby which initiates the beginning of the closing angle pulse $S_5$ (see FIG. 4). This closing angle pulses $S_5$ is concluded in the manner already described in greater detail above in the case of the tooth 27, when the triggering value of the comparator 33 is reached.

Since the numerical value of the counter 23 in the range of the 115th – 123rd tooth has the binary value "0010" corresponding to the value "4," i.e., it possesses the binary value "1010" (corresponding to the decimal value "5") at the position of the takeover, at "128" or "0" the counting cycle of the counter 23 is not corrected at this position of the cycle of the counter by a renewed acceptance of the value "7." This is because the cycle of the counter 23 and the counter 18 is selected so that it corresponds to the number of main pulses per rotation.

A limiting case is that of reception of the value "4" which is also the triggering value. If a change is made from lower speeds which correspond to the transfer value "3," to a speed corresponding to the transfer value "4," then the operating pulse appears at the output 36 at the moment of transfer at "0" in FIG. 4. During the next rotatiton, however, the counter 18 is advanced to the value "4" so that during this and all continuing cycles with the same transfer value "4," the operating pulse appears at the tooth 124 (see Table 1, fourth horizontal column).

As shown in Table 1 (column V), the value of the closing angle $\phi$ relative to the advance angle $\alpha$ and determined substantially by the reduction ratio of the counter 18 (or 23b in FIG. 9, referred to in greater detail below), in conjunction with the programed value of the comparator 34, is in the range of 7.1 to 8. This range, in which the value of the closing angle may fluctuate, occurs in the present embodiment because the counter 18 acting as divider for the counter 23, also accepts the numerical value of the counter 8 upon the appearance of the auxiliary pulse at 73 as a result of its function as a trigger counter for the comparator 33 (together with the counter 29). If a suitable divider (such as 23b in FIG. 9) is associated with the counter 23 and receives only pulses directly from the transmitter 2 (i.e., not through the counter 18), then there would be no variation of the value of the closing angle, such as column V in Table 2 shows (which refers to FIG. 9 and which is described in greater detail hereinafter).

However, this applies only under the condition that the number N of the teeth distributed over the circumference of the disc 3 in the range 4 is equal to the produce of the number Z of the possible conditions of the counter 8 with the return value of the divider ratio $q$, in the following case, therefore N = A × 1 : 9, i.e., 16 × 8 = 128.

If the number N deviates from this value, there are fluctuations in the relative value of the closing angle which may be admissible or not, according to the deviation. In any case, the range of fluctuation of the relative closing angle (column V in Table 1) caused by the counter 18 in FIG. 3 is admissible and insignificant in comparison with the fact that a separate divider (23b in FIG. 9) is saved in this way.

It is also possible to select the number of teeth and gaps greater than Z × 1 : $q$, in particular, according to the ratio N = $n$ × Z × 1 : $q$ in which $n$ is a positive factor greater than 1, preferably a whole number. If $n = 2$, then the following ratios occur which are described with reference to FIG. 5.

FIG. 5 corresponds in principle to FIG. 4, but in this case 256 teeth are present. The embodiment shown in FIG. 3 is satisfactory if, for example, a single tooth falls into the predetermined time $t$ (see first horizontal column in Table 1); then the closing angle extends from the tooth 23 to the tooth 31. The same is repeated after 128 teeth, so that another equal closing angle appears between the teeth 151 and 159. The closing angles therefore appear centrally and symmetrically distributed over the circumference of the circle shown in FIG. 5, if $n$ is a whole number. If, however, $n$ is not a whole number, the second (and possibly other closing angles) appears also 128 teeth later, because of the periodicity of the counter, so that the closing angles are not then distributed centrally symmetrically.

Figure 3:
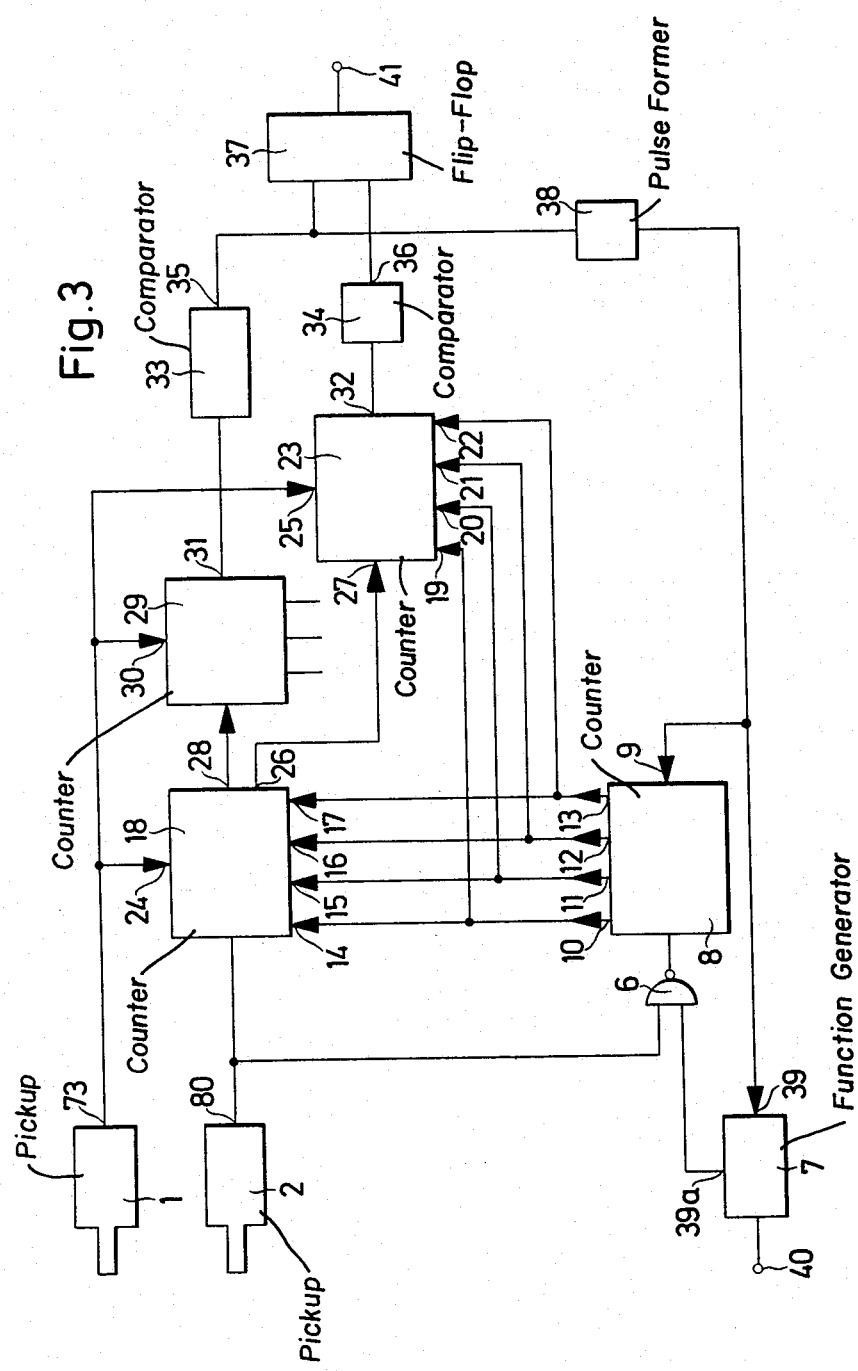
FIG. 3 shows a circuit of a first embodiment of the invention.
Figure 13:
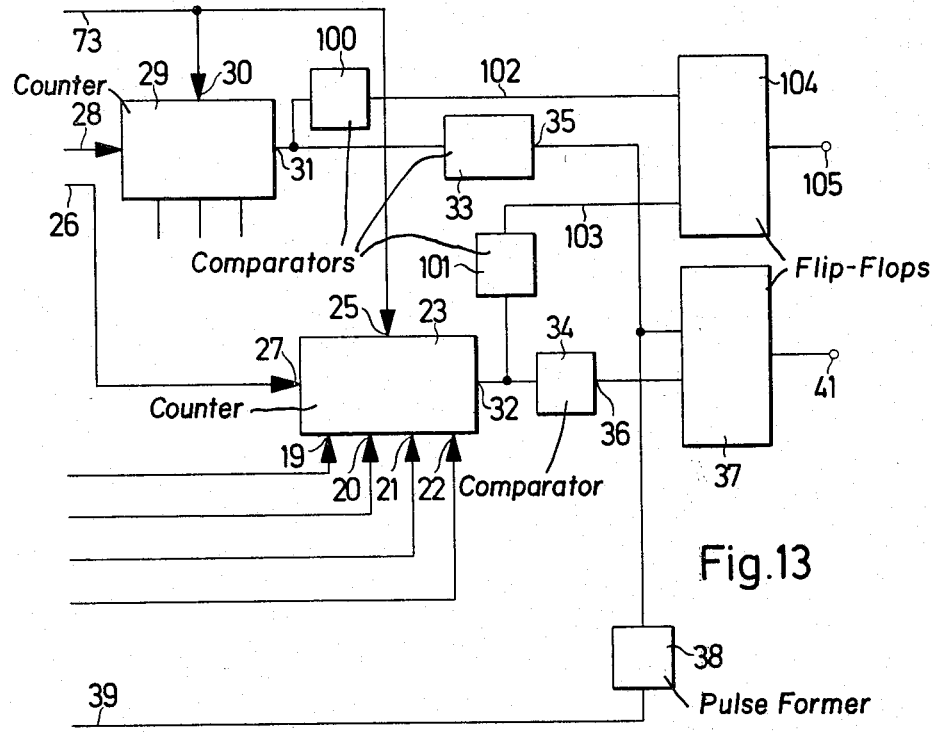

However, these closing angle pulse appear, in the embodiment shown in FIG. 3, at the same output 41. However, it would be desirable for the distribution of ignition pulses that, as in the case of FIG. 13 (see the associated description below,) the various closing angle pulses should be available at separate outputs. A possibility of achieving this is shown in FIG. 6. This figure corresponds to FIG. 3, but in this case the output 41 is connected to the inputs of NAND gates 150 and 151 respectively. The two other inputs of the gates are interconnected by means of an inverter 152, the input of which is connected to the ouput of a 1 : 2 divider 153, so that one or other gate is opened according to the output condition of the divider 153. Their output changes upon the appearance of a pulse at the input of divider 153. This takes place in FIG. 5 for the first time at the thirty-first tooth, where the output condition changes from "0" to "1." In this case the next closing angle pulse appears at the output 154 of the gate 150; with the appearance of the pulse (ignition pulse) from the 159th tooth at the output 35, the output of the divider 153 changes from "1" to "0," so that the next closing angle pulse (again between the teeth 23 and 31) occurs at the output 155 and so on.

The synchronising input 156 of the divider 153 is derived from the output 73 so that the output condition of the divider 153 always has the value "0" with the tooth "0" or "256."

FIGS. 7 to 9 show embodiments of the present invention which, although not quite so simple as the embodiment in FIG. 3, are also advantageous and represent solutions of the problem to which the invention is directed. These embodiments in particular may be regarded (in the sequence of the figures) as initial stages of the preferred embodiments of FIG. 3 so that the following description thereof is simultaneously an additional description of the principle on which the embodiment according to FIG. 3 is based:

FIGS. 7 to 9, in which the outputs of the counters are shown combined by a line, each have a construction corresponding in many respects to that of FIG. 3, so that the parts corresponding in principle are provided with the same reference numerals and no special description is necesssary, apart from important variations.

In the embodiment shown in FIG. 7, the pulse generator 7 is designed to have two outputs 39a and 39b, a pulse being produced at the output 39a, (as in FIG. 3), the length of which is equal to the predetermined time $t$ corresponding to the advance angle $\alpha$; also a pulse is produced at the output 39b, the duration T of which corresponds to the length of the advance angle $\alpha$ plus the length of the closing angle $\phi$, i.e., it is equal in time to the sum of the time $t'$ necessary for the build-up of the magnetic field in the ignition coil and the predetermined time $t$ by which ignition is to be advanced relatively to the upper dead centre OT.

The output 39b is switched to one input of an additional inverter AND gate 6', to the other input of which the output of the transmitter 2 is applied. Consequently, the counter 8' stores a number of pulses which corresponds to the time T with the particular speed of rotation of the disc 3 (FIG. 2). This counter can be returned by way of a cancelling input 9' corresponding to the counter 8 when a pulse appears there, by way of the pulse former 38.

If an auxiliary pulse then appears in the transmitter 1 and causes the counter 18 to assume the numerical value of the counter 8, and the counter 23 the numerical value of 8' (at the position "0" in FIG. 4) and both comparators 33 and 34 are adjusted to the same trigger value and give a pulse when the associated counters 18 and 23 reaches a pre-determined value, then, after a certain initial number of pulses from the transmitter 2, a pulse will appear at 36, because T is greater than $t$, followed somewhat later by a pulse at 35. These two pulses correspond to positions A and Z in FIG. 1 (the pre-determined numerical value is selected greater than the numerical values of the counters 8 and 8' to be expected).

The system shown in FIG. 7 therefore operates in the range of the unit groups 1, 2, 7, 6, 8, 18, 33, and 1, 2, 7, 6', 8', 23, 34 on the principle shown in the following patent specifications:

German Pat. No. 1,917,389, German published specification No. 2,010,999, U.S. Pat. No. 3,696,303.

However, this system goes beyond these disclosures since it contains minimalising of the closing angle $\phi$ and delivers a pulse at the output 41 at the optimal closing angle.

In this connection, it should be pointed out that the invention, as described for example in U.S. Pat. No. 3.696,303 (particularly in connection with FIG. 6), does not depend on whether the counters 18 and/or 23, are allowed to count forwardly or backwardly to obtain the triggering value of the comparator 33, or 34, and may be supplied in the latter case with a number of pulses before counting, particularly with a number which corresponds to the trigger value provided in the comparator 33, or 34, and only then takes over the pulses from the counters 8 and 8' negatively and receives the pulses from the transmitter 2 so that the comparators 33 and 34 deliver a pulse at the value 0. This also applies in connection with the other embodiments described here, since the latter method of procedure is only a reversal of the operations, using the method of procedure for the embodiment. It should also be pointed out that, if desired, instead of the binary parallel feed of the numerical values of the counter 8 and 8' to the counters 18 and 23, a series may also be fed by way of the counting inputs or by a corresponding system and control of gates ahead of the counters 8 and 23, under which condition the counters 8 and 8' may be dispensed with. The same also applies to the other embodiments.

In this connection it seems appropriate to ascertain whether, apart from the series feed and/or other auxiliary pulses (in this case not used for synchronising) further pulses can also be fed through the counting inputs additionally to the parallel feed, whereby the same effect is obtained as though the programed value of the comparator 33 and/or 34 and/or 100 and/or 101 had been changed. The introduction of these auxiliary pulses is effected in predetermined phase positions of each period of rotation of the engine.

The embodiment according to FIG. 8 corresponds to that of FIG. 7. However, the counters 8' and the gate 6' are omitted, and the function generator 7 is designed as in the embodiment shown in FIG. 3, i.e., it delivers at the output 39a a pulse the length of which corresponds to the advance angle $\alpha$. Apart from the counter 18, the counter 23 is coupled to the counter 8. Whilst, however, the counter 18 assumes the single numerical value of the counter 8 upon the appearance of an auxiliary pulse from the transmitter 1, this numerical value is multiplied in a multiplier 23a between the output of the counter 8 and the set input of the counter 23, to seven or eight times the value, which the counter 23 then takes over. In this manner the closing angle $\phi$ receives a multiple value of the advance angle $\phi$, both comparators 33 and 34 can be programmed with the same trigger value. For example, if the condition of the counter 8 at transfer is "9," then the counter 18 receives the numerical value "9" and the counter 23 the numerical value "63" (multiplied seven times); if the trigger value of the comparator 33 and 34 is set at "96," then if the counting of the pulses from the transmitter 2 begins at "0" in FIG. 4, a pulse appears at the output 36 in the position 96 − 63 = 33 in FIG. 4 and a pulse at the output 35 at the position 96 − 9 = 87 in FIG. 4, (in this case the top dead centre would correspond to the position "96" in FIG. 4).

It would be possible to insert a corresponding auxiliary between the counter 8 and the counter 18 and to connect the counter 23 directly to the counter 8 (i.e. not through 23a); but this procedure is less preferable, particularly because the accuracy of the advance angle $\alpha$ is much more important than the value of the closing angle, which should not be below a certain minimum, but otherwise can fluctuate within certain limits.

In the embodiment shown in FIG. 9, both counters 18 and 23 (as in FIG. 3), accept the same numerical value from the counter 8, but the numerical input of the counter 23 is in this case derived from a divider 23b which passes each 8th pulse of the transmitter 2 to the counter 23; at the same time, the comparator 34 is programed so that it triggers at a value which is equal to the trigger value of the comparator 33 multiplied by the division ratio of the divider 23b. If, therefore the comparator 33 is programed to the trigger value "32" and the division ratio $q - 1/8$, the matrix 34 is programed to the trigger value $32 \times \frac{1}{8} = 4$. Otherwise, the system according to FIG. 9 may be constructed (including counter 29) exactly as the arrangement in FIG. 3.

As may be perceived by a comparison of the two FIGS. 3 and 9, the advantage of the system shown in FIG. 3 compared with that of FIG. 9 resides in the feature that a separate divider 23b is unnecessary, because the counter 18 in FIG. 3 simultaneously takes over the function of this divider. As shown by a comparison of Table 1 with Table 2, interpreted to explain the embodiment according to FIG. 9, a certain range of fluctuation is acceptable in the closing angle $\phi$; this is quite acceptable.

No additional explanation of Table 2 should be necessary, since this Table is immediately understandable, after knowledge of the above explanation of Table 1.

FIG. 10 shows an embodiment of the circuit according to FIG. 3 with an additional circuit arrangement which comprises the components 70, 71 and 77 and serves to avoid faulty pulses at the moment of switching on and starting the engine. This is very important, because the counting process in the circuit of FIG. 3 is already beginning when pulses are emitted by transmitter 2. During the first rotation of the output shaft of the internal combustion engine, the counters of FIG. 3 are not synchronised with the movement of the engine as long as no auxiliary pulse (which could also be termed reference point pulse or synchronising pulse) is derived from transmitter 1. The entire program provided in the circuit according to FIG. 3 is effected only if a trigger pulse has appeared at least once at the input 39.

The additional circuit of FIG. 10 (only the parts modified relatively to FIG. 3 are shown, and this also applies to the following Figures and to FIG. 6) comprises two RS flip-flips 70 and 71 which have the property of assuming a predetermined condition when the operating voltage is switched on, in the present case the condition "0." The set input 72 of the flip-flop 70 is connected to the output 73 of the transmitter 1, so that the condition of this flip-flop at the output 74 changes to the value "1" upon the appearance of a pulse from transmitter 1. The input 75 of the flip-flop 71 is connected to the trigger pulse input 39 of the function generator 7, so that the output 76 of this flip-flop changes into the condition "1" upon the appearance of a trigger pulse at 39. The outputs 74 and 76 are connected to a respective input of a triple AND gate 77, the third input of which is connected through the lead 35a of the comparator 33 and its output through the lead 35b to the return input of the flip-flop 37 located directly at the output of the comparator 33 in FIG. 3. The gate 77 is therefore inserted in the lead 35 of FIG. 3.

The mode of operation of the circuit according to FIG. 10 is as follows:

To ensure that a pulse entering the flip-flop 37 may become operative at the output 35, the connections of the gate 77 to the flip-flops 70 and 71 must have the condition "1," but this is only possible if a pulse has appeared at least once at the outputs 73 and 79. Consequently, a pulse appearing at the output 35 can become effective as an ignition pulse only after the counting operations are synchronised with the engine rotation. If the accuracy of the first ignition pulse is reduced or if the counter 8 (by suitable design) automatically assumes the condition "0000" when switched on, the flip-flops 71 may be unnecessary and the gate 72 formed as a double AND gate. It should finally be pointed out that the locking of the system until the beginning of synchronisation can be effected in any suitable position.

Ignition coils can be made much smaller and cheaper if they are protected from thermal overloading, i.e., if, despite the switched-on ignition or with the internal combustion engine stopped (in the range of the closing angle), ignition coil current is suppressed. This can be achieved with the circuit according to FIG. 11 by delivering a periodic reset pulse sequence, preferably the output pulses from the output 80 of the transmitter 2, to the input 81 of a re-triggerable monoflop 82 which has the condition "1" at its output 87 for so long as the time interval of the individual pulses of the sequence is below the reset time of the monoflop 82, which is the case from a predetermined minimum number of rotations. The condition appearing at the output 87 is connected to one input 41c of a NAND gate 84, the other input 41a of which is connected to the output 41 of the flip-flop 37, whilst the output 41b of the gate 84 leads to the ignition coil, so that the flow of current from the output 41 to the ignition coil is released through the gate 84 only when a certain minimum speed of rotation is attained. In order to prevent the current to the ignition coil being unintentionally interrupted and an undesired ignition pulse being consequently produced, an additional device 85, preventing this abrupt interruption, is provided between the output 87 and the input 41c; the additional device may be a capacitor connected between the terminal 87 and earth, or a sawtooth generator with a long switch-off face, or it may be achieved by the gate 84 itself, if a slowly closing gate is selected.

Due to the design of the present invention as a digital system, it is easily possible to carry out a fault analysis. For example, if the synchronising - transmitter 1 failed, it may cause damage to the internal combustion engine. Such danger is prevented by the circuit shown in FIG. 12. In this case, a counter 90 has its counting input 91 connected to the trigger pulse input 39 and its reset input 92 to the output 73 of the transmitter 1. The output 93 of the counter 90 is applied to one input of a NAND gate 94, the other input of which is connected to the output 41. Connection 41b thereof leads to the ignition coil.

The mode of operation is as follows:

Since a pulse appears at the input 39 of the function generator 7 and a pulse from the transmitter 1 only once per movement phase (or engine rotation), a dangerous error occurs if a pulse appears (more than once) at the input 39 without a pulse from the transmitter 1 appearing between two pulses of this type. In the case of such an alternative appearance, at the most, one pulse can be registered by the counter 90. This counter is designed so that it normally has the condition "1" at its output 93, but on receipt of more than one pulse at the output 93, the condition "0" appears, so that nor further pulses reach the output 41b. A safety device 95 can be connected to the output 93, for example, a warning lamp or a buzzer, the actuation of which is effected by means of the output signal "1" at 93.

For the ignition of multi-cylinder engines, separate pulse sequences are required each having a phase difference from one another. For example, for a two-disc rotary piston engine, two separate output pulses are necessary with a phase angle of 180° between them. These pulses may be achieved with a circuit according to FIG. 13, where two comparators 100 and 101 are included in the circuit according to FIG. 3 with their inputs connected to the outputs 31 and 32, and programed so that they each produce a pulse at their outputs 102 and 103, said pulse following the pulse occurring at the outputs 35 and 36 respectively with a phase angle of 180° between them. The outputs 102 and 103 are connected to the inputs of an RS flip-flop 104 so that at its output 105 closing angle pulses occur which are displaced through 180° of the eccentric shaft motion relatively to the closing angle pulses appearing at the output 41, and control the ignition (including switching on of the ignition coil) of the second disc of the rotary piston engine. With 128 teeth on the circumference of the disc 3 in row 4 (FIG. 2) the switching or trigger value of the comparator 100 is set at the value "64" and that of the comparator 101 at the value of "8" (on account of the division) higher than the switching or trigger value of the comparator 33 or 34.

Figure 14:
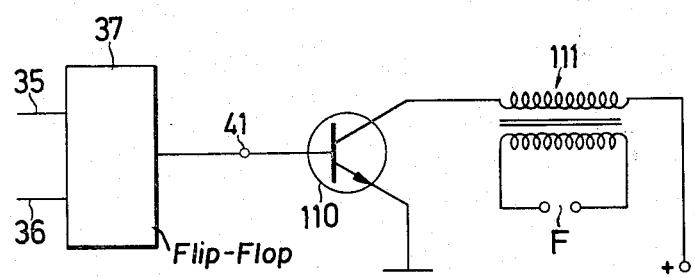
FIGS. 14 and 15 show preferred coupling means between the ignition means of an internal combustion engine to apparatus of the present invention.

As shown in FIG. 14, the pulses appearing at the output 41 and/or 105 (not shown) can switch an output transistor 110 directly through its base, the collector circuit of this transistor including the primary coil 111, the secondary coil of which is connected to the spark plug F. The output transistor 110 may be a Darlington pair, whilst ignition pulse forming members may be provided between the ignition coil and the spark gap.

Figure 15:
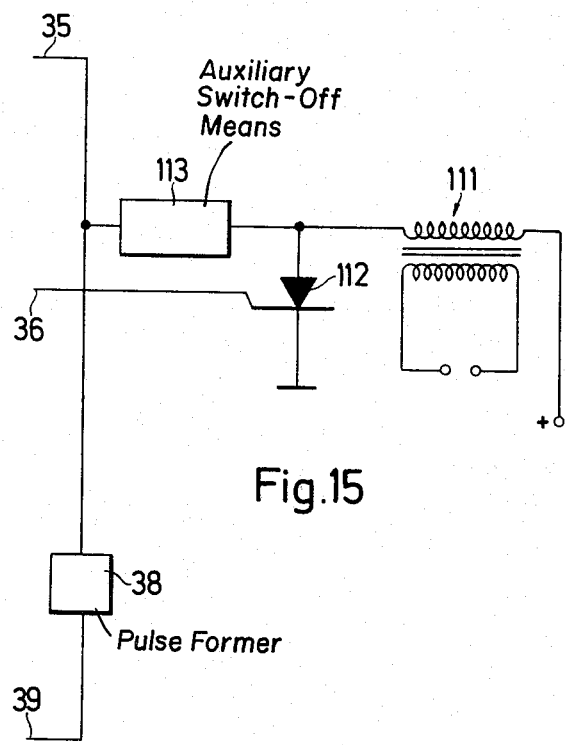

The ignition can be simply achieved if, according to FIG. 15 a thyristor 112 is directly fired by the output 36 of the comparator 34, and the ignition coil 111 in series with the thyristor, the latter being directly extinguished by means of an auxiliary means 113 controlled directly by the output 35 of the comparator 33.

I claim:

1. A method of producing an operating pulse signal for determining the value and phase position of the closing angle of the ignition system of an internal combustion engine, said method comprising producing pulse sequences, the pulses of which are synchronised with the rotary movement of the internal combustion engine, and determining an advance angle $\alpha$ corresponding to a predetermined time $t$ by which the ignition spark of the internal combustion engine is to be advanced relatively to the top dead centre thereof by counting the pulses appearing during the time $t$ at a particular speed of rotation of the internal combustion engine, subtracting them from pulses representing a larger angle $\psi$ which extends between the top dead centre and an arbitrary phase position $\psi O$, advanced relatively thereto before the counting of the said predetermined pulses begins from the position $\psi O$, producing, during this counting, an ignition pulse when the differential angle $\psi - \alpha$ is traversed, so that the ignition pulse is advanced by the angle $\alpha$ relatively to the top top dead centre, and representing a trigger angle $\delta$ which changes in the same manner as the angle $\alpha$ in dependence on the speed of engine rotation and is equal to the sum of the angle $\alpha$ and the closing angle $\phi$ by a number of pulses dependent on the speed of rotation U, subtracting said trigger angle $\delta$ as represented from the angle $\psi$ before the counting of the predetermined pulses from the position $\psi O$ begins, to produce an operating pulse during this counting after the differential angle $\psi - \delta$ is traversed, so that the operating pulse occurs advanced by the closing angle $\phi$ relatively to the advance angle $\alpha$.

2. A method as recited in claim 1, wherein the number of pulses corresponding to the trigger angle $\delta$ is ascertained by adding the pulses occurring during a trigger time T, said pulses being equal to the sum of the pulses in the predetermined advance time $t$ and the pulses in the proposed closing time $t'$ of the ignition device.

3. A method as recited in claim 1, including the step of deriving the number of pulses corresponding to the trigger angle from the number of pulses corresponding to the advance angle $\alpha$.

4. A method as recited in claim 3, wherein the number of pulses corresponding to the trigger angle $\delta$ is a multiple of the number of pulses corresponding to angle $\alpha$.

5. A method as recited in claim 1, wherein said operating pulse is delivered to the switch-on input and the ignition pulse to the switch-off input of a circuit controlling the ignition coil.

6. A method as recited in claim 5, wherein the operating pulse is delivered to the set input and the ignition pulse to the reset input of an RS flip-flop so that a pulse appears at the output of said flip-flop, the duration of said pulse and its phase position corresponding to the closing angle.

7. A method as recited in claim 1, wherein the method includes supplying the auxiliary pulses of a predetermined phase position corresponding to the trigger time and those corresponding to the advance time to corresponding working counters, these counters being supplied with the pulses appearing from the arbitrary phase position $\psi O$, the operating pulse being produced in a comparator connected to one working counter when said working counter has received from the arbitrary phase position as many pulses as correspond to the traverse of the angle between the reference angle $\psi$ and trigger angle $\delta$, while in another comparator connected to the otherworking counter, the ignition pulse is produced when this working counter has received from the optical phase position $\psi O$ as many pulses as corresponds to the traverse of the differential angle $\psi - \alpha$, the comparator values being changed if required by supplying resetting pulse sequences.

8. A method as recited in claim 7, wherein the pulses corresponding to the trigger time and those corresponding to the advance time are each counted in a measuring counter and stored and fed into the corresponding working counter upon the appearance of the auxiliary pulse.

9. A method as recited in claim 7, wherein the pulses corresponding to the advance time are counted in a measuring counter and stored and the resultant number supplied directly into the second working counter upon the appearance of the auxiliary pulse, the ignition pulse being produced in the comparator associated with said second working counter, while a numerical value such as a multiple of the value of the measuring counter, derived from the counting condition of the measuring counter, is supplied simultaneously into the first working counter in whose associated comparator the operation is produced.

10. A method as recited in claim 7, wherein the pulses corresponding to the advance time are counted in a measuring counter and stored and the numerical value supplied directly into the first and second working counters upon the appearance of the auxiliary pulse, and the main pulses appearing from the arbitrary phase position $\psi 0$ are supplied into the first working counter but reduced in a predetermined reduction ratio $q$.

11. A method as recited in claim 10, wherein the reduction is effected in the second working counter.

12. A method as recited in claim 1 wherein all the counted pulses are distributed equidistantly over the movement period of the internal combustion engine.

13. A method as recited in claim 12 wherein the counting period of the second working counter is made equal to the number of main pulses distributed equidistantly over the movement period.

14. A method as recited in claim 13, wherein said number of main pulses is reduced such that the reduction ratio is equal to the quotient of the number of main pulses distributed over the movement period, and the number of possible counting conditions of the measuring counter.

15. A method as recited in claim 14, wherein the trigger value of the comparator associated with the first working counter is equal to the product of the trigger value of the comparator and the reduction ratio associated with the second working counter.

16. A method as recited in claim 8 wherein the measuring counter is reset by the pulses which are triggered from a comparator associated with a working counter.

17. A method as recited in claim 1, wherein at least one auxiliary pulse per movement period of the internal combustion engine is used to effect the transmission of the closing angle pulse to the ignition device.

18. A method as recited in claim 17, wherein the transition of the closing angle pulse to the ignition device is effected by the appearance of at least one auxiliary pulse.

19. A method as recited in claim 17 wherein the transmission of the closing angle pulse to the ignition device is released only by alternately appearing auxiliary and closing angle pulses.

20. A method as recited in claim 17, wherein the transmission of the closing angle pulse to the ignition device is blocked by termination of the auxiliary pulses.

21. A method as recited in claim 20, wherein the blocking is effected if a synchronising auxiliary pulse does not appear alternately with a working or an ignition pulse.

22. A system for use with an ignition system of an internal combustion engine, wherein an operating pulse signal is produced for determining the value and phase position of the closing angle $\phi$ of an ignition system, said system determining an advance angle, $\alpha$ corresponding to a predetermined time $t$ by which the ignition spark of an internal combustion engine is to be advanced relative to the top dead centre thereof by subtracting a value corresponging to $\alpha$ from a value representing a larger angle $\psi$ which extends between the top dead centre and an arbitrary phase position $\psi 0$ advanced relative thereto for computing a differential angle $\psi - \alpha$, which angle when traversed advances the ignition pulse by an angle $\alpha$, and wherein a value representing a trigger angle $\delta$, which changes according to engine rotation and equals the sum of $\alpha$ plus $\phi$, is subtracted from the angle $\psi$ so that the operating pulse will be advanced by the closing angle $\phi$ relative to the advance angle $\alpha$, said system comprising:

at least one measuring means for obtaining a number of main pulses corresponding to the advance angle $\alpha$ and the trigger angle $\delta$ synchronously with the rotation of the internal combustion engine, said pulses being distributed over the movement period of the combustion engine;

a first counting and comparing means for receiving the pulse value corresponding to the advance angle $\alpha$ or a derivative thereof from said measuring means in a predetermined phase of the movement period of the internal combustion engine, said means, starting from an arbitrary phase point $\psi 0$, counting main pulses and, in a predetermined counting condition corresponding to the traverse of the differential angle $\psi - \delta$ from said position $\psi 0$, delivering an operating pulse; and a second counting and comparing means for receiving the numerical pulse value corresponding to the advance angle $\alpha$ from the measuring means in a take-over phase for counting the main pulse starting from the point $\psi 0$ and, in a predetermined counting condition corresponding to the traverse of the angle $\psi - \alpha$ from the position $\psi 0$, delivering an ignition pulse.

23. A system as recited in claim 22 wherein the said first counting and comparing means includes a first working counter and a first comparator connected to the output thereof, and the second counting and comparing means includes a second working counter and a second comparator connected to the output thereof, each comparator being supplied with a reference count which can be changed.

24. A system as recited in claim 23, wherein a divider is associated with the counting input of said first working counter when the numerical value of the measuring device corresponding to said advance angle is supplied directly to said counter.

25. A system as recited in claim 24, wherein the divider is incorporated in the second working counter.

26. A system as recited in claim 23 wherein an identical number of additional comparators is connected to the outputs of said first and second working counters respectively, said additional comparators being programmed so that at least one operating and one ignition pulse appears at the outputs of each two comparators not connected to the same working counter, per movement period, said operating and ignition pulses being phase-shifted relatively to the other operating and ignition pulses, the closing angle pulses defined by the operating and ignition pulses being distributed at the same time intervals over the movement period of the internal combustion engine.

27. A system as recited in claim 26, wherein the number of the main pulses distributed over the movement period and the periodicity of said second working counter in conjunction with said first working counter, and the programming of the comparators are selected so that several associated operating and ignition pulses which define several closing angle pulses, appear at the outputs of said comparators per engine revolution.

28. A sytem as recited in claim 27, wherein the outputs at which the operating pulses appear, are each connected to the switch-on input of a switch device controlling an associated ignition coil whilst the outputs at which the associated ignition pulses appear are connected to the switch-off input of said switch device, so that at least one closing angle pulse appears per movement period at the output of each switch device.

29. A system as recited in claim 28, wherein said switch device is a RS flip-flop.

30. A system as recited in claim 28, wherein said switch device is a thyristor with a cancelling means.

31. A system as recited in claim 28 wherein said switch device is associated with an output transistor controlling the current in said ignition coil.

32. A system as recited in claim 28 wherein the output of said switch device is supplied to an input of each of a plurality of gates, the other switching inputs of which gates are controlled by a device in such manner that the closing angle pulses appearing several times per movement period are distributed over the outputs of the gates.

33. A system as recited in claim 32, wherein the output of said switch device is connected to a respective input of a gate, the other two switching inputs of which are interconnected by an inverter, the input of which is connected to the output of a 1 : 2 divider, the counting input of the latter being connected to the output of one comparator and its cancelling input to the output carrying auxiliary pulses.

34. A system as recited in claim 22 wherein a multiple AND gate is associated with the output conducting said ignition pulses, the control inputs of said gate being each connected through a control device to outputs conducting auxiliary pulses so that said ignition pulses are passed only when the counting operations are synchronised with the movement period of said internal combustion engine.

35. A system as recited in claim 22 wherein there is a gate associated with said output at which the closing angle pulse appears, the control input of which is connected to the output of a control device, the control input or inputs of which are connected to outputs conducting auxiliary pulses and main pulses, said control device being formed so that it blocks the passage of the closing angle pulses under predetermined faulty operating conditions of the system.

36. A system as recited in claim 35, wherein said control device is a re-triggerable mono-stable circuit, the input of which is connected to the output conducting the main pulses and the output of which retains the condition "1" for as long as the time interval of the individual main pulses is within the specific time of the mono-stable circuit.

37. A system as recited in claim 35, wherein said control device is a counter the counting input of which is connected to the output at which the pulse controlling the measuring device appears, whilst its cancelling input is connected to the output conducting said synchronising auxiliary pulse, the counter being designed so that it has the condition "1" at the output when a pulse appears alternately at its two inputs, but otherwise has the condition "0."

38. A system as recited in claim 23 wherein one or both counters are each connected to the main pulse transmitter through a gate to feed the pulses appearing during the time $t$, before the counting, from the value 0 onwards.

39. A system as recited in claim 23 wherein one or more additional counters are provided to obtain the number of main pulses corresponding to the time $t$ and $T'$.

* * * * *